United States Patent [19]

Tatsuno et al.

[11] Patent Number: 4,779,943

[45] Date of Patent: Oct. 25, 1988

[54] OPTICAL SYSTEM FOR SEMICONDUCTOR LASER AND OPTICAL INFORMATION PROCESSING EQUIPMENT UTILIZING THE SAME

[75] Inventors: Kimio Tatsuno, Koukubunji; Susumu Saito, Hachioji; Akira Arimoto, Musashimurayama; Keiji Kataoka, Kawagoe, all of Japan

[73] Assignees: Hitachi, Ltd.; Hitachi Koki Co., Ltd., both of Tokyo, Japan

[21] Appl. No.: 578,209

[22] Filed: Feb. 8, 1984

[30] Foreign Application Priority Data

Feb. 16, 1983 [JP] Japan .................................. 58-22850

[51] Int. Cl.⁴ ........................ G02B 5/32; G02B 27/10
[52] U.S. Cl. .................................... 350/3.7; 350/3.72; 350/169
[58] Field of Search ...................... 350/3.72, 3.70, 169; 369/110, 112

[56] References Cited

U.S. PATENT DOCUMENTS

| | | | |
|---|---|---|---|
| 4,253,723 | 3/1981 | Kojima et al. | 350/3.72 |
| 4,355,858 | 10/1982 | Funato et al. | 350/3.72 |
| 4,458,980 | 7/1984 | Ohki et al. | 369/112 |
| 4,497,534 | 2/1985 | Sincerbox | 350/3.72 |

FOREIGN PATENT DOCUMENTS 58-79207  5/1983  Japan .................................. 350/3.72

OTHER PUBLICATIONS

Jenkins and White, *Fundamentals of Optics*, McGraw Hill, 1957, (pp. 6-10).

Sincerbox, G. T., "Formation of Optical Elements by Holography", IBM Tech. Disc. Bull., vol. 10, No. 3, Aug. 1967, pp. 2-3.

*Primary Examiner*—Bruce Y. Arnold
*Attorney, Agent, or Firm*—Antonelli, Terry & Wands

[57] ABSTRACT

An optical system and a optical information processing equipment utilizing the same are disclosed. The optical system comprises a laser diode and a hologram lens has an interference fringe prepared by the interference of a beam having substantially the same intensity distribution and/or phase characteristic as that of a laser beam emitted from the laser diode with a beam having a desired characteristic. The laser beam from the laser diode is irradiated on the hologram lens so that its characteristic is converted into the desired characteristic.

5 Claims, 6 Drawing Sheets

OPTICAL SYSTEM FOR SEMICONDUCTOR LASER AND OPTICAL INFORMATION PROCESSING EQUIPMENT UTILIZING THE SAME

The present invention relates to an optical system for semiconductor lasers especially a laser, diode, and more particularly, to an optical system having a hologram lens and an optical information processing equipment utilizing the same.

In recent years, the semiconductor laser, especially a laser diode, has been used as a light source for an optical information processing equipment such as a laser printer or an optical disc. In the optical information processing equipment, irrespective of the type thereof, a high utilization efficiency of light is demanded and the formation of an isotropic or non-elliptical light spot is required.

In effect, however, the laser diode generally has a larger beam divergence than a gas laser and besides emits a laser beam having an elliptical intensity distribution. Therefore, in order to collect a laser beam emitted from a laser diode 1, it is necessary to use a lens 2 of a large numerical aperture (NA) as shown in FIG. 1a, to use a prism beam shaper 3 without resort to the large NA lens as shown in FIG. 1b, or to use a cylindrical lens set 4 as shown in FIG. 1c. Disadvantageously, the beam shaping in the prior art systems requires complicated and expensive optical systems.

The present invention contemplates elimination of the prior art drawbacks and has for its object to provide a simplified and inexpensive optical system for a laser diode and an optical information processing equipment utilizing the same.

According to this invention, in order to accomplish the above object, a hologram lens is used which is prepared by the interference of one beam component having such a characteristic inherent to a laser beam emitted from a laser diode that the beam has, for example, an elliptical cross-sectional area and/or an aberration with the other beam component free from the characteristics, and the laser beam from the laser diode is irradiated on the hologram lens so that the characteristic inherent to the laser beam can be corrected.

The present invention will be apparent from the following detailed description taken in conjunction with the accompanying drawings, in which:

FIG. 9b is a side view of FIG. 9a;

FIG. 10b is a side view of FIG. 10a;

FIG. 11b is a side view showing a recording section of the optical system shown in FIG. 11a;

FIG. 12b shows changes in a beam spot shape useful in explaining the operation of the optical system shown in FIG. 12a;

FIG. 12c shows a construction of a photodetector used in the optical system of FIG. 12a;

The invention will now be described by way of example.

Figure 1A:
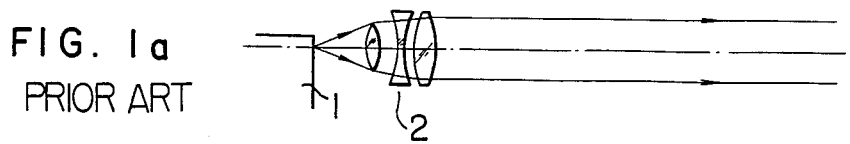
FIGS. 1a to 1c are diagrams showing prior art collecting and shaping optical systems for a laser beam emitted from a laser diode.
Figure 1B:
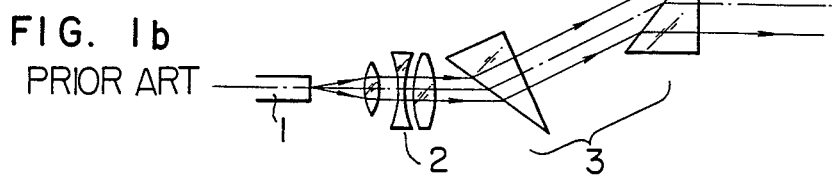
Figure 1C:
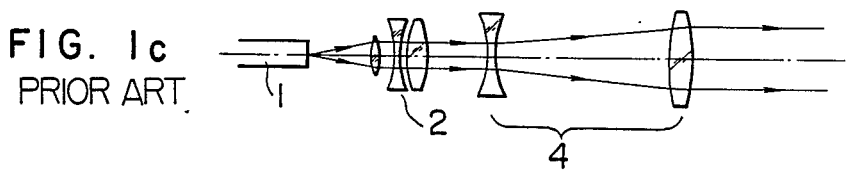
Figure 2A:
FIGS. 2a and 2b are diagrams showing embodiments using a hologram lens in accordance with the invention.
Figure 2B:
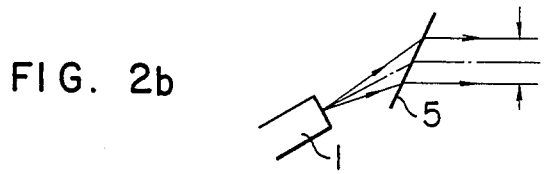
Figure 3A:
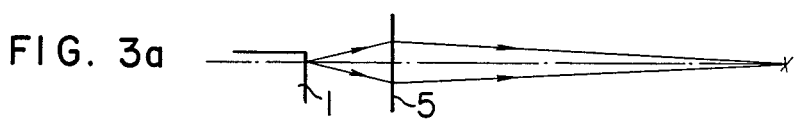
FIGS. 3a and 3b are diagrams showing an embodiment using a focussing hologram lens in accordance with the invention.
Figure 3B:
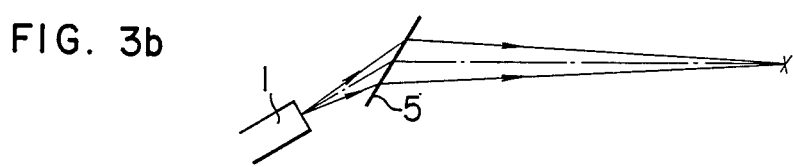

As described previously, the laser beam emitted from a laser diode has a beam spot of an elliptical intensity distribution characteristic. Then, elliptical to non-elliptical conversion of the intensity distribution will first be described. As shown in FIGS. 2a and 2b, a hologram lens 5 used in the present invention collects a laser beam emitted from a laser diode 1 and shapes an elliptical beam into a non-elliptical beam. FIG. 2a shows a view in a plane perpendicular to the junction plane of the laser diode and FIG. 2b shows a view in a plane parallel to the junction plane. In this embodiment, the beam, having passed through the hologram lens 5 is a parallel plane wave but alternatively, a focussing optical system as shown in FIG. 3a and 3b may be used, as desired. FIG. 3a shows a view in a plane, perpendicular to the junction plane of the diode laser and FIG. 3b shows a view in the junction plane of the diode laser. Further, the hologram lens may obviously be prepared so as to reconstruct a divergent beam.

Figure 4:
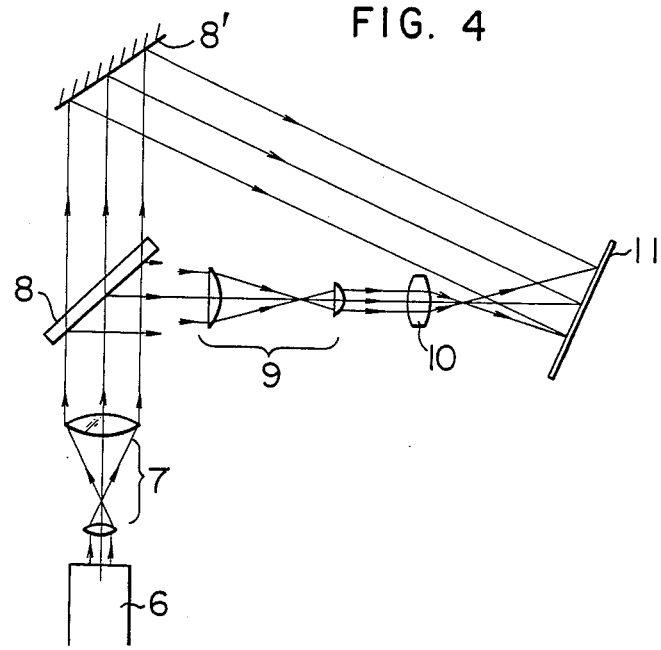
FIG. 4 is a diagrammatic representation of an optical system for preparation of a hologram lens.

The hologram lens shown in FIGS. 2a, 2b, 3a and 3b is prepared through an optical system as illustrated in FIG. 4. A beam emitted from a laser light source 6 is expanded by a beam expander 7 to an expanded beam having a desired beam size of a non-elliptical cross-sectional area and thereafter split by a beam spitter 8 into two beam components. One beam component is reflected at a mirror 8' to reach a hologram plate 11. This beam component acts as a reference beam having the non-elliptical cross-sectional area. The other beam component is reduced in beam size by an inverted beam expander 9 comprised of a set of cylindrical lenses and thereafter passed through an objective 10 to be converted into an object beam. The object beam reaching the hologram plate 11 cooperates with the reference beam to form an interference fringe. Upon the formation of the interference fringe, the object beam has an elliptical cross-sectional area whereas the reference beam has a non-elliptical cross-sectional area. The reduction rate for the beam size of the object beam is so set that the beam spot shape on the hologram plate 11 is non-elliptical. Such a reduction rate can be obtained by determining a ratio between focal lengths of the respective cylindrical lenses. For example, when the major/minor axis ratio in elliptical intensity distribution of the laser beam from the laser diode is 1:3, the focal length ratio of the cylindrical lens set is 1:3.

Further, the numerical aperture (NA) of the objective 10 is made coincident with a wider (major axis) beam divergence (usually, vertical to the junction plane) of the laser diode the beam emitted from which is to be shaped.

The hologram plate 11 may be made of a volume type phase hologram material having high diffraction efficiency, for example, a gelatin film.

As the light source 6 for hologram recording a gas laser or a laser diode may be used.

Figure 5:
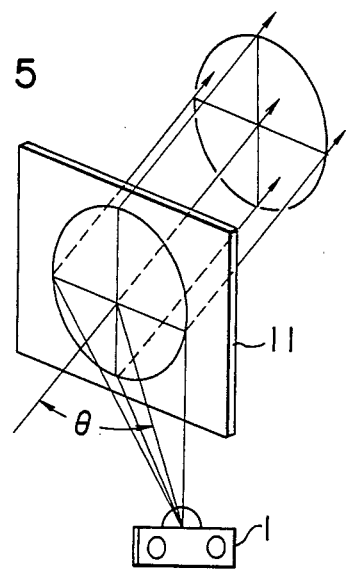
FIG. 5 is a diagram showing a beam reconstructed from the hologram lens.

Referring to FIG. 5, a beam emitted from a laser diode 1 is irradiated on the thus prepared hologram lens so that an elliptical beam may be shaped into a non-elliptical beam.

In FIG. 5, the elliptical beam from the laser diode 1 obliquely irradiates the hologram lens 11. This beam is diffracted by an interference fringe recorded in the form of a hologram and a non-elliptical beam is reconstructed from the hologram lens.

The positional relationship between the hologram lens and the laser diode is such that the hologram lens is inclined in a plane containing an axis of a narrower (minor axis) intensity distribution (usually, aligned with the junction plane) of the laser beam emitted from the laser diode by $\theta$ with respect to a line connecting the center of the hologram lens and a beam emission port of the laser diode as shown in FIG. 5. The magnitude of $\theta$ is so determined as to make the reconstructed beam non-elliptical. As will be understood from the above, it is assumed that the hologram lens 11 in this exmple is prepared under a condition that the optical axes of the object and reference beams make the angle $\theta$.

Figure 6:
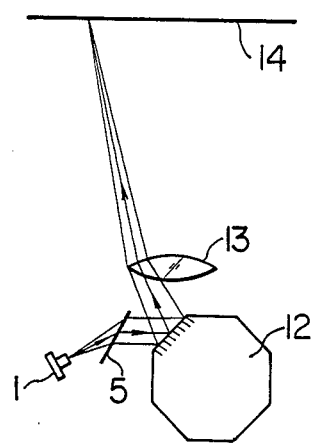
FIGS. 6 and 7 show applications of the present invention to a laser printer.
Figure 7:
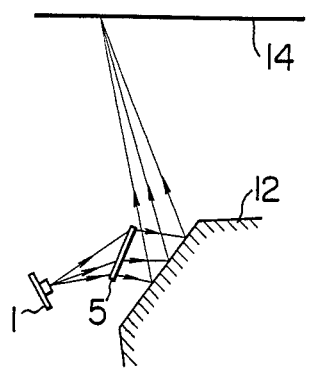

Referring to FIGS. 6 and 7, the hologram lens according to the present invention is applied to a light source of a laser beam printer. In these figures, the junction plane of a laser diode 1 is parallel to the sheet of drawing. In FIG. 6, the application is implemented in terms of the embodiments shown in FIGS. 2a and 2b whereas in FIG. 7, the application is implemented in terms of the embodiments shown in FIGS. 3a and 3b.

In operation, a laser beam having passed through a hologram lens 5 is reflected at a polygon mirror 12 and focused onto a scanning surface 14 such as a photosensitive drum via an F$\theta$ lens 13 so that the scanning surface is scanned with the laser beam as the polygon mirror rotates.

Figure 8:
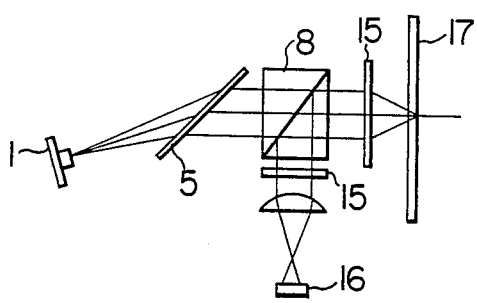
FIG. 8 shows an application of the present invention to an optical head for an optical disc.

Referring to FIG. 8, the hologram lens according to the present invention is applied to a recording and reproducing head of an optical disc. The junction plane of a laser diode 1 is parallel to the sheet of drawing.

In operation, a beam emitted from a laser diode and having an elliptical intensity distribution is converted into a non-elliptical beam by means of a hologram lens 5 according to the present invention and reaches an optical disc 17 via a beam splitter 8 and a focusing lens 15. A reflection beam from the optical disc returns via the focusing lens 15 and beam splitter 8 to a photodetector 16 which effects signal detection.

In the foregoing description, the hologram lens is applied to the beam shaping optical system but it may be applied to other types of optical system in accordance with teachings of the present invention.

Figure 9A:
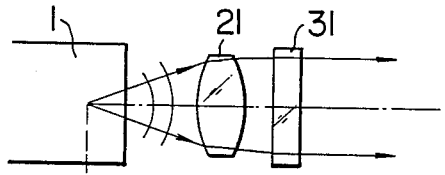
FIG. 9a is a plan view showing a prior art aberration correction coupling optical system.
Figure 9B:
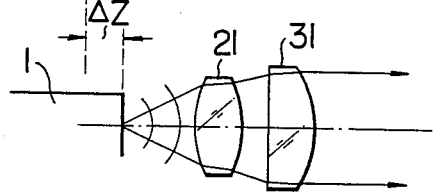

Next, conversion of the phase characteristic of a beam from a laser diode will be described. Specifically, in accordance with the present invention, an optical equipment with a hologram lens suitable for correcting an aberration of a laser diode can be materialized. For example, in a gain guide type laser diode as shown in FIGS. 9a and 9b, a displacement $\Delta z$ sometimes occurs between a beam waist position for a beam emission in a direction vertical to the junction plane (FIG. 9b) and a beam waist position for a beam emission in a direction parallel to the junction plane (FIG. 9a), and the displacement needs to be corrected when the laser beam is used as a source of light for an optical disc or a laser printer. Conventionally, it has been the practice to use for the correction an optical system consisting of a coupling lens 21 and a cylindrical lens 31 in combination. An alternative method for this purpose is to use a uniform paraxial beam which has passed through a coupling lens of a small NA. However, the former method requires a number of optical parts and sophisticated adjustment for individual lenses and in the latter method, the light utilization efficiency is low because of the small NA. According to the present invention a single hologram lens substitutes for the conventional optical system consisting of the coupling lens and cylindrical lens in combination, thereby providing a compact and light optical system for a laser diode.

Figure 10A:
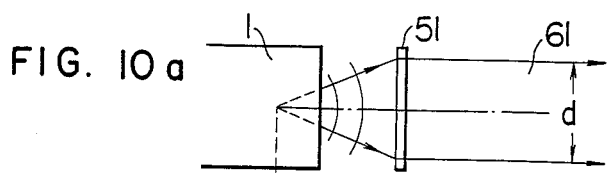
FIG. 10a is a plan view showing a coupling optical system using a hologram lens according to the invention.
Figure 10B:
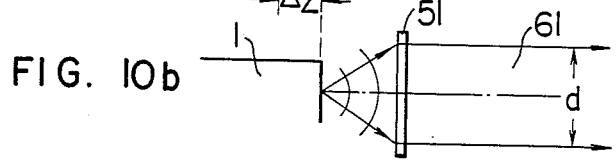

More particularly, reference should be made to an embodiment of the present invention as shown in FIGS. 10a and 10b. FIG. 10a shows a beam emission in a direction parallel to the junction plane of a laser diode and FIG. 10b shows a beam emission in a direction vertical to the junction plane. A hologram lens 51 collects beams emitted from a laser diode 1 and corrects a displacement $\Delta z$ between beam waist positions to provide a wave front 61 free from aberration which in turn is used as a source of light for an optical information processing equipment such as an optical disc head or a laser printer.

In this case, it is possible to produce a beam of a desired beam size d by selecting a distance between the laser beam emission port and the hologram 51 in accordance with a beam divergence of the beam emitted from the laser diode. In FIGS. 10a and 10b, the axis of the beam incident to the hologram lens is coaxial with the axis of the beam diffracted from the hologram lens to construct a so-called in-line type equipment. However, when a more uniform beam is desired in consideration of a diffraction efficiency distribution of the hologram lens, an off-axis type equipment may obviously be constructed wherein the axis of the incoming beam to the hologram lens makes an angle to the axis of the outgoing beam from the hologram lens.

Figure 11B:
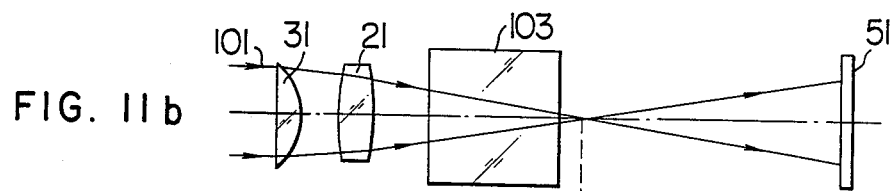
Figure 11A:
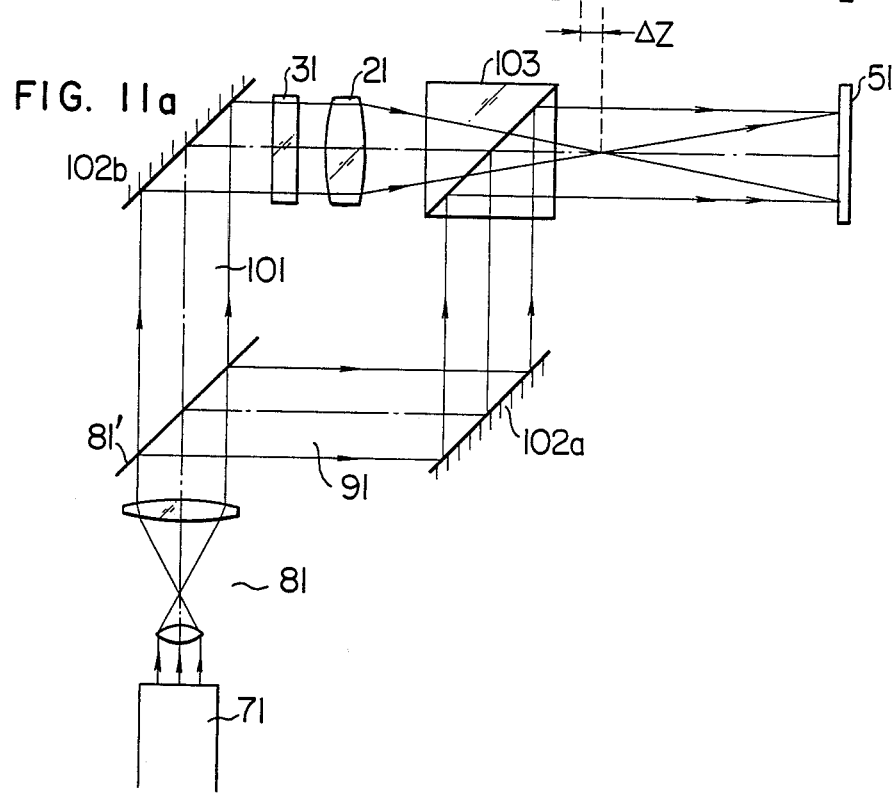
FIG. 11a is a plan view showing an entire optical system for preparation of the hologram lens used in the present invention.

FIGS. 11a and 11b show the manner of preparing a hologram lens which functions to correct an aberration. Although this example will be explained by way of a laser diode which emits a beam having an aberration and a non-elliptical intensity distribution, it may obviously be applicable to a laser diode which emits a beam having an elliptical intensity distribution. In operation, a beam from a laser source 71 (such as a gas laser or a laser diode) is expanded by a beam expander 81 and split into two beam components by means of a first beam splitter 81″. One beam component 91 serving as a reference beam is twice reflected at a first beam mirror 102a and then at a second beam splitter 103 and reaches a hologram plate 51. The other beam component 101 serving as an object beam is reflected at a second beam mirror 102b and passes through a cylindrical lens 31 adapted to provide an aberration, a focussing lens 21 and the second beam splitter 103. Then, the object beam, being of a non-elliptical distribution but having an astigmatic aberration $\Delta z$, reaches the hologram plate 51 at which it interferes with the reference beam being of a non-elliptical distribution and free from aberration. An interference fringe is thus formed to record an object beam wave front on the hologram plate 51. A thus prepared hologram lens functions as a lens with aberration correcting capability. The hologram lens prepared through the method as described with reference to FIGS. 11a and 11b is an in-line type hologram lens but an off-axis hologram lens may otherwise be prepared by displacing the axis of the reference beam. If a laser diode which emits a beam having an elliptical distribution and an astigmatic aberration is used, the methods for preparation of hologram lenses as shown in FIGS. 4, 11a and 11b may obviously be combined together to prepare a hologram lens which can correct the elliptical distribution and the aberration. Of FIGS. 11a and 11b, the former is a plan view of an optical system for preparation of the hologram lens and the latter is a side view of a recording section of this optical system. The hologram lens 51 prepared through the optical system of FIG. 11 is disposed such that the lens portion shown in FIG. 11a corresponds to the arrangement of FIG. 10b while the lens portion shown in FIG. 11b corresponds to the arrangement of FIG. 10a.

Figure 12A:
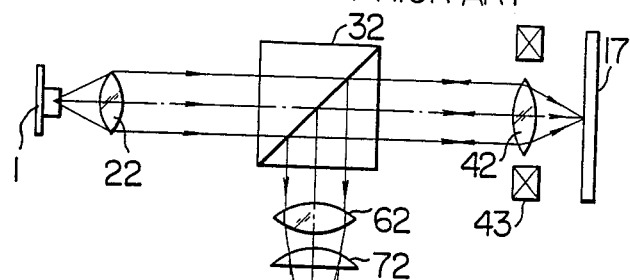
FIG. 12a shows a prior art optical system of an optical head.
Figure 12C:
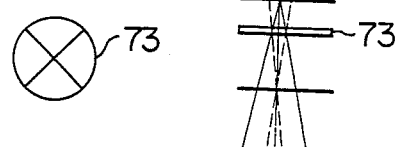
Figure 12B:

As described above, according to the present invention, various types of optical equipments utilizing the hologram lens of various functions can be realized. Accordingly, the present invention can be evaluated as making use of a holography technique for the sake, of providing a hologram lens which can simultaneously fulfill the three functions of the beam splitter, condenser lens and cylindrical lens conventionally used in the optical head. More particularly, a prior art recording and reproducing head for an optical disc as shown in FIG. 12a employs a beam splitter 32 disposed in an optical path for deriving a reproduced signal and an autofocus signal from an optical disc 17, and an autofocus optical system including a lens 62 for collecting a reflected beam from the optical disc 17 and a cylindrical lens 72. A number of these optical parts are all made of glass with the weight of the optical system increased and in addition they are expensive. With the FIG. 12a optical system further comprising a condenser lens 42, a voice coil 43 for driving the condenser lens 42 and a photodetector 73 having four divided light receiving surfaces as shown in FIG. 12c, the autofocus operation is carried out by detecting a displacement of the focal point as a change in beam spot shape as shown in FIG. 12b by means of the cylindrical lens 72 and the photodetector 73 in cooperation therewith.

Figure 13:
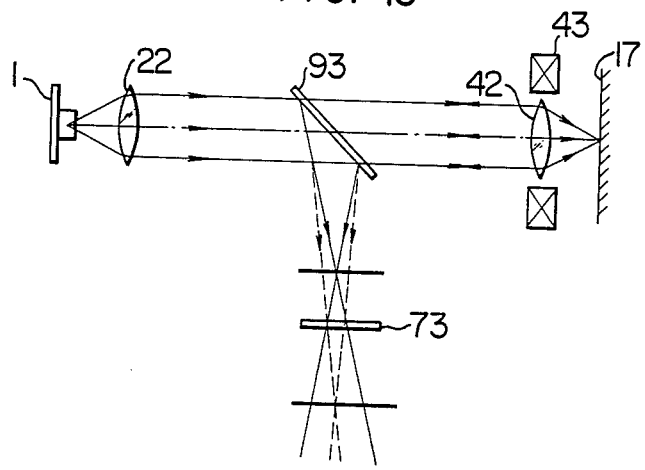
FIG. 13 is a diagram of an optical head using an optical equipment according to the present invention.

FIG. 13 shows an embodiment of the present invention in which a hologram lens substitutes for the beam splitter, cylindrical lens and collecting lens constituting the conventional optical head set forth above. In FIG. 13, a beam emitted from a laser source 1 is collected by a coupling lens 22, passed through a hologram lens 93 prepared according to teachings of the present invention, and focussed by a focussing lens 42 onto an optical disc 17 to form a beam spot thereon. A reflected beam from the optical disc 17 is diffracted by the hologram lens 93 and directed to a photodetector 73. The hologram lens 93 fulfils the function of an astigmatic aberration type autofocus optical system to form a longitudinally elliptical beam spot or a transversely elliptical beam spot as shown in FIG. 12b in accordance with an out or in focussing on the optical disc 17. The photodetector 73 is divided into four portions. The autofocus operation is so effected that the beam spot on the photodetector 73 becomes circular in focus and the difference output from the photodetector becomes zero.

Thus, the hologram lens 93 fulfils simultaneously the three functions of the beam splitter 32, collecting lens 62 and cylindrical lens 72 as shown in FIG. 12a.

Figure 14:
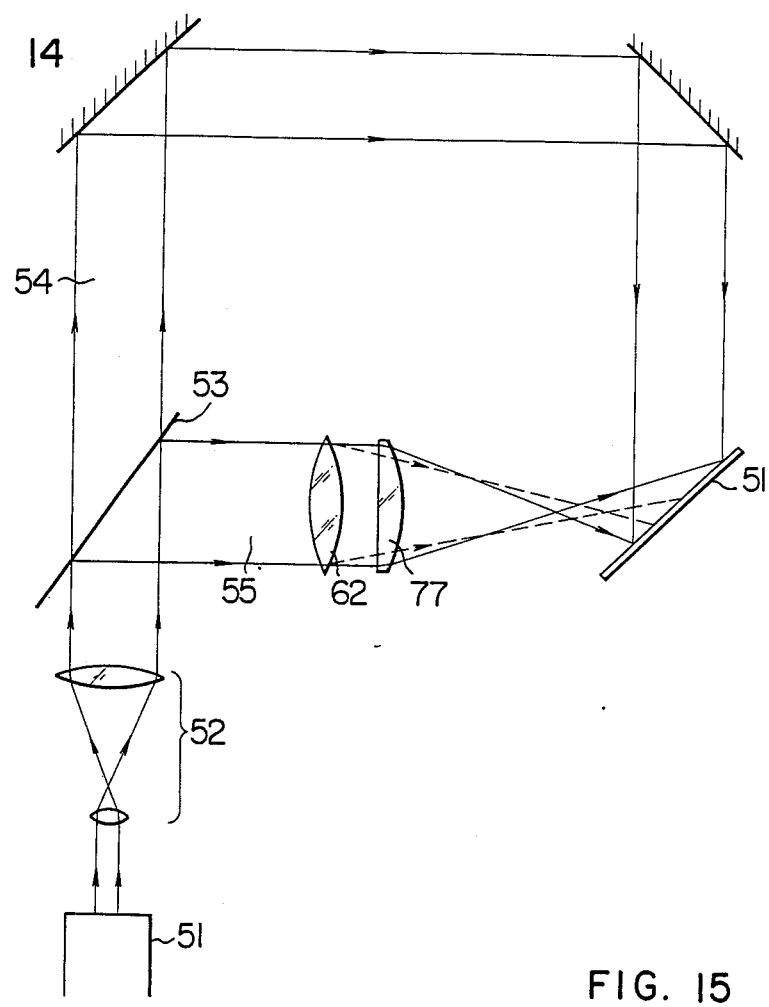
FIG. 14 shows an optical system for preparation of a hologram lens used in the present invention.

This hologram lens is prepared through an optical system as shown in FIG. 14. A beam emitted from a laser source 51 is expanded by a beam expander 52 and split by a beam splitter 53 into a reference beam 54 and an object beam 55. The object beam 55 is passed through a focussing lens 62 and a cylindrical lens 72 to produce a wave front having an aberration which in turn reaches a hologram plate 51 at which it interferes with the reference beam free from aberration so that a hologram lens 93 in accordance with teachings of the present invention can be prepared. The axis of each of the object and reference beams has an incident angle of about 45° with respect to the hologram plate.

Since the thus prepared hologram lens is disposed as shown in FIG. 13 to act as a key element of a recording and reproducing head for an optical disc, the number of optical parts can be reduced by ⅓ as compared to the prior art method and a compact, light-weight and inexpensive head can be materialized. Quantity of light to the photodetector 73 can be optimized by changing the diffraction efficiency of the hologram lens 93.

Figure 15:
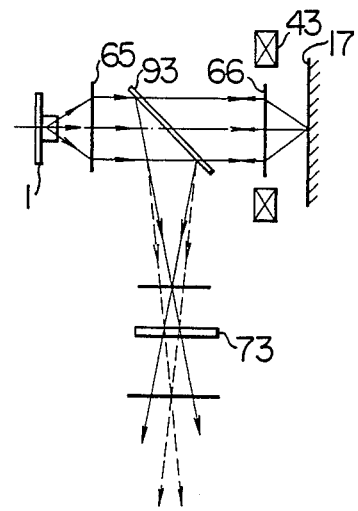
FIG. 15 shows an optical system incorporating additional hologram lenses which are combined with the optical equipment according to the present invention.

If additional hologram lenses 65 and 66 fulfilling the function of the coupling lens and the focussing lens are used as shown in FIG. 15, it is possible to further reduce weight and size of the entire optical head.

Figure 16:
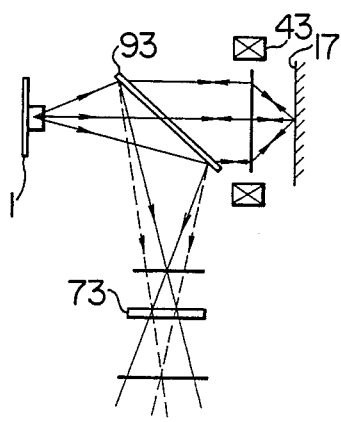
FIG. 16 is a diagram of an embodiment of the invention wherein a hologram lens for the optical equipment according to the invention is added with the function of a coupling lens.

Furthermore, a hologram lens 93 added with the functions of the coupling lens 22 (FIG. 13) and the hologram lens 65 (FIG. 15) may be arranged as shown in FIG. 16 to facilitate further reduction in the number of optical parts, weight and size. Such a hologram lens can be prepared through a multiple exposure hologram recording method.

As has been described, the present invention can ensure drastic reduction in weight and size and simplification of the scanning optical system for laser printer and the optical disc head. For example, while the prior art coupling and beam shaping optical system has a combination of the coupling lens and prism system whose weight amounts to about 5 gr, the optical equipment of the present invention can be reduced to about 0.5 gr in weight and by about 1/50 lin volume. In addition the number of optical parts amounting to 4 to 5 on account of the provision of the lens and prism in the prior art optical equipment can be made singular in the optical equipment according to the present invention. Further, in contrast to the fact that the lens and prism raise the cost in mass production since there is involved a polishing process in their fabrication, the hologram lens can be adapted for mass production by simple repetitive recording process, leading to cost reduction. The cost reduction can be enhanced by preparing the hologram through a replication process.

More significantly, since, according to the present invention, the laser beam from the laser diode can be collected and at the same time the aberration can be corrected by the single optical element, a diffraction limited high-quality beam serving as the light source for the optical disc head and laser printer can be obtained.

We claim:

1. An optical information processing equipment comprising:
   a semiconductor laser light source;
   a recording medium;
   an optical system interposed between said semiconductor laser light source and said recording medium for directing a laser beam from said semiconductor laser light source to said recording medium, said optical system including a first hologram lens having interference fringes prepared by the interference of a beam free from aberration with a beam having an aberration in which the beam comes to focus at different points in directions perpendicular to each other, said first hologram lens diffracting a reflected beam from said recording medium separately from the beam irradiated from said semiconductor laser light source onto said recording medium and converging the diffracted beam to different focal points in directions perpendicular to each other; and
   a photodetector disposed between said focal points.

2. An optical information processing equipment according to claim 1, wherein said optical system includes a first lens for collimating the laser beam from said semiconductor laser light source and a second lens for collecting a collimated beam from said first lens onto said recording medium, said frist hologram lens being disposed in an optical path between said first and second lenses.

3. An optical information processing equipment according to claim 1, wherein said optical system includes a second hologram lens for collimating the laser beam from said semiconductor laser light source and a third hologram lens for focusing a collimated beam from said second hologram lens onto said recording medium, said first hologram lens being disposed between said second and third hologram lenses.

4. An optical processing equipment according to claim 1, wherein said interference fringes of said first hologram lens are multiply-recorded with interference fringes which collimate the beam from said semiconductor light sources in said first hologram lens, said first hologram lens delivering a collimated beam toward said recording medium.

5. An optical information processing equipment according to claim 1, wherein said optical system includes a second hologram lens for focusing the collimated beam from said first hologram lens onto said recording medium.

* * * * *